(12) United States Patent
Lettovsky et al.

(10) Patent No.: US 7,050,987 B2
(45) Date of Patent: May 23, 2006

(54) SYSTEM AND METHOD FOR COORDINATING TRAVEL ITINERARIES

(75) Inventors: Ladislav Lettovsky, Vail, CO (US); Saurabh V. Mehta, Irving, TX (US); Kyle N. Morris, Grand Prairie, TX (US); Richard M. Ratliff, Flowermound, TX (US)

(73) Assignee: Sabre Inc., Southlake, TX (US)

( * ) Notice: Subject to any disclaimer, the term of this patent is extended or adjusted under 35 U.S.C. 154(b) by 213 days.

(21) Appl. No.: 10/634,582

(22) Filed: Aug. 5, 2003

(65) Prior Publication Data

US 2005/0033614 A1 Feb. 10, 2005

(51) Int. Cl.
*G06Q 10/00* (2006.01)
(52) U.S. Cl. .......................................................... 705/6
(58) Field of Classification Search ..................... 705/6
See application file for complete search history.

(56) References Cited

U.S. PATENT DOCUMENTS 5,237,499 A * 8/1993 Garback ......................... 705/5
5,832,453 A * 11/1998 O'Brien ........................... 705/6
6,023,679 A * 2/2000 Acebo et al. ................... 705/5

FOREIGN PATENT DOCUMENTS

JP 2001357101 * 12/2001

OTHER PUBLICATIONS

No author; Group travel planning; Apr. 28, 2003; Travel Agent v 312, n5, p. 37; dialog copy 1 page.*

* cited by examiner

*Primary Examiner*—Thomas A. Dixon
(74) *Attorney, Agent, or Firm*—Alston & Bird LLP

(57) ABSTRACT

The methods and systems for coordinating the travel itineraries of multiple travelers, who are leaving from more than one origin location, but are arriving at the same destination location, provide automated techniques for determining which itineraries for each traveler best meets the specified criteria for the trip. For example, a travel organizer may specify certain travel criteria for a trip, such as the relative importance of the travel schedules versus the price. A set of suggested travel itineraries that most closely meet the specified criteria are then provided, in addition to the amount of time between when any two travelers arrive at and/or leave from the destination location, and the price. Furthermore, the travel coordination techniques provide flexibility by allowing replacement of one or more of the suggested itineraries with other possible itineraries and recalculation of the time amounts and the price(s).

38 Claims, 5 Drawing Sheets

FIG. 3

| | Airline | TIMES | | STOPS | ▽Price | Waiting Time (mins) |
|---|---|---|---|---|---|---|
| ⊙ | DL 675 | 7:00p | 8:08p | 0 | 0 | -28 |
| ○ | AA 1236 | 7:05p | 8:25p | 0 | +$49 | -11 |
| ○ | AA 3433 / 545 | 8:05p | 8:34p | 1 | +$55 | -2 |
| ○ | UA 590 | 7:05p | 9:45p | 0 | -$35 | +69 |
| ○ | AA 4335/5656 | 6:00p | 10:00p | 1 | +$25 | +84 |

Select Flight Close

Your Itinerary to Denver, Colorado-Message...  [_][□][X]
File  Edit  View  Insert  Format  Tools  Table  Window
Send:
To: Joe.Doe@anonymous.com                                    HTML
Cc:
Subject: Your Itinerary to Denver, Colorado Dear Mr. Doe:

Here are the details of your trip to join a group in

Denver, Colorado

Arriving November 4th—Departing November 10th.

Please select the URL given below to confirm your trip:
TripDenver_Nov4_Nov10/Confirm.htm We hope you have a nice and a safe trip.

For your convenience you can communicate with your group using the following email address.
mailto:Denver_Nov4_Nov10@MyGroupTravel.com Thank you for choosing My Group Travel.

Regards,

My Group Travel Reservations

---

122 —

Here are your travel details for trip to Denver, CO on Nov 4, 2002. Please confirm you itinerary and choose your seats. Seats are not guaranteed until you confirm this itinerary with your credit card payment.

Dallas/FtWorth (DFW to Denver (DEN)

| Modify | American Flight 2839 Boeing 757 200 | Nov 4 Nov 4 | 7:22 pm depart DFW 8:34 pm arrive DEN | Class: Coach Fare Rules | DELETE — 126 |

Sunday, Nov 10

Denver (DEN) to Dallas/Ft Worth (DFW)

| Modify | American Flight 2726 MD Super 80 | Nov 10 Nov 10 | 3:06 pm depart DEN 6:05 pm arrive DFW | Class: Coach Fare Rules | DELETE — 126 |

CHOOSE YOUR SEATS — 128                                    Total Airfare (including taxes)  USD 421.00

MyGroupTravel offers you to Share your Rental Car with other group members. The rental car expenses would be shared among your members. Click on link to Add or Modify your car rental reservations.

You have selected HERTZ for your car rental from Nov 4 to Nov 10
  Location: Denver Int. Airport, CO
  Pick Up Date/Time: Nov 4 @ 7 pm
  Drop off Date/Time: Nov 10 @ 6 pm
  Total Rental Price (inclusive taxes): USD 380.00
  No. of people sharing the car: 4
  (Traveler share: USD 95)

You have selected HYATT REGENCY, Denver, CO for the group to share their Hotel from Nov 4 to Nov 10.
  Location: Hyatt Regency Downtown, Denver, CO
  Details: Two Double Bed Rooms
  Check In Time: Nov 4 @ 1 pm
  Check out Time: Nov 10 @ 11 am
  Total Hotel Booking (inclusive taxes): USD 620.00
  (Traveler Share: USD 155.00)

— 130

Payment Information

Total Amount:  USD 671.00

Credit Card Type: [Master ▼]   Card Number: [            ]   Name on the card: [            ]   Expiration Date: [      ] (mm/yy)

— 132

SYSTEM AND METHOD FOR COORDINATING TRAVEL ITINERARIES

BACKGROUND OF THE INVENTION

This invention relates to techniques for the coordination of multiple travel itineraries for multiple travelers who are departing from various origin locations and traveling to the same destination location. According to one advantageous aspect, the invention provides techniques for minimizing the amount of time between the arrival times associated with the outbound itineraries and the departing times associated with the inbound itineraries, such that the travelers arrive at and depart from the destination at as close to the same time as possible.

In many types of business and personal travel, multiple travelers are expected to arrive at the same destination to participate in the same or similar activity. Frequently, the multiple travelers must originate their travel from different origin locations. For instance, a manager of a business with employees located in more than one city, state or country may call a meeting that requires all employees of the business to gather at a certain location and time. Furthermore, a family reunion may be planned, which requires the family members, many of whom do not live in the same place, to gather at a certain location and time. Thus, many of the employees and family members must travel to the certain location prior to the time of the meeting or reunion, respectively. For the travelers that do not drive themselves, such as those that arrive at the destination via a plane, train or other mode of mass transportation, it would generally be advantageous for them to arrive at the destination around the same time so that they can more easily share the other travel expenses, such as lodging arrangements, transportation to the lodging, transportation to the activity, etc. As such, two or more of the travelers may desire to coordinate their travel itineraries so that they arrive at the destination at as close to the same time as possible. In the same way, the travelers may also desire to coordinate their travel itineraries so that they depart the destination at as close to the same time as possible so that they may share transportation expenses to an airport, train station, or other departing location, or for any other reason.

Coordinating travel arrangements for two or more travelers can be a daunting task, however, and the more travelers, the more complicated an endeavor to coordinate travel arrangements is. Typically, if more than one traveler from different origin locations would like to arrive at and/or leave a destination location at approximately the same time, someone must personally evaluate all of the possible travel arrangements (itineraries) for each traveler and determine which itinerary for each traveler will permit the travelers to arrive at and/or leave the destination as close as possible to the same time. Simultaneously, the person evaluating all of the possible travel itineraries for each traveler must keep in mind the date and time of any activity or activities that any or all of the travelers must attend.

For example, in the past, a travel organizer, such as a travel agent or other individual who may or may not be a traveler themselves, would have to access a central reservation system for the desired type of transportation and perform separate searches to obtain the various travel itineraries for traveling to a certain destination from each traveler's origin location that met the overall travel criteria, such as the date for the travel. Once the travel organizer obtains the various travel itineraries for each traveler, the travel organizer must then manually evaluate the itineraries in light of the desires of the travelers. For example, if the travelers and/or organizer specify that the travelers should arrive at and/or depart from the destination at as close to the same time as possible, regardless of the cost, then the travel organizer must determine which itineraries meet the specific scheduling requirements only. If, however, the travelers and/or organizer specify that the travelers should arrive at and/or depart from the destination at as close to the same time as possible without exceeding a certain price for one or more of the itineraries or a certain overall price for all of the itineraries, then the organizer must not only evaluate the itineraries in light of the schedule requirements, but also must consider the pricing of one or more of the itineraries. As such, as the number of travelers and/or the number of itineraries that the travel organizer must evaluate increases, the more confusing for the organizer and the more risk that the organizer will make an error or overlook a viable travel option for one or more of the travelers. Furthermore, if one or more of the travelers desires to make changes to their respective itineraries, the organizer must manually gather and identify all of the viable travel options to present to the respective traveler based upon the schedule and/or price requirements. Then, if a change is made to one traveler's itinerary, the organizer must determine how that affects the other travelers' waiting times once they arrive at the destination and/or the prices of the travel. Manually coordinating travel itineraries for multiple travelers who are traveling from different origin locations to one destination location, therefore, is a very time-consuming and error-prone process.

Thus, there is a need for automated techniques to coordinate the travel itineraries of multiple travelers arriving at and leaving from one destination location, but originating travel from multiple origin locations. In particular, there is a need for automated techniques that are capable of coordinating the travel itineraries of multiple travelers based upon specified requirements regarding schedule and/or pricing, including permitting changes to individual travel itineraries, in an efficient and accurate manner.

BRIEF SUMMARY OF THE INVENTION

According to the present invention, the methods and systems for coordinating the travel itineraries of multiple travelers, who are leaving from more than one origin location, but are arriving at the same destination location, provide automated techniques for quickly and accurately determining which travel itineraries for each traveler best meet the specified criteria for the trip. For example, the methods and systems of the present invention permit a travel organizer to specify certain travel criteria for a trip, such as the date(s) of travel or the relative importance of the travelers arriving at the destination location at as close to the same time as possible (i.e. the schedule) versus the overall price of the itineraries for all of the travelers (i.e. the price). The methods and systems then provide a set of suggested travel itineraries that most closely meets the specified criteria, in addition to providing the amount of time between when any two travelers arrive at and/or leave from the destination location, and the overall price or individual prices for each traveler. Furthermore, the travel coordination techniques provide flexibility by allowing the organizer and/or the travelers to view all of the possible itineraries and replace one or more of the suggested itineraries, then recalculate the time amounts and the price(s).

One embodiment of the methods and systems for coordinating multiple outbound and inbound itineraries includes receiving a destination location, multiple origin locations, each of which is associated with at least one traveler, and other travel information, such as, but not limited to, the dates and desired times of travel. An indication regarding the relative weight between price and schedule of at least some of the outbound and inbound itineraries is also received. For instance, one or more client elements, such as a laptop computer, a personal computer or workstation, networked personal computers or workstations, or the like, may receive the information. A travel database that includes at least outbound and inbound itineraries may then be accessed, such as by a processing element, and at least one outbound and inbound itinerary between the destination location and each origin location is identified based upon the travel information provided. From the identified itineraries, a suggested outbound and inbound itinerary between the destination location and each origin location may be determined based upon the relative weight between schedule and price; again typically by a processing element. Furthermore, one or more storage elements may store all of the identified itineraries.

Other embodiments of the methods and systems include presenting the suggested outbound and inbound itineraries for review, such as via one or more display elements. If a traveler or the travel organizer desires to review alternatives to at least one of the suggested itineraries, an indication that alternative itineraries are desired for at least one of the suggested itineraries associated with a respective traveler may be received. If an indication that alternative itineraries are desired is received, then other identified outbound and inbound itineraries between the destination location and an origin location may be presented for review. An indication of a selection of at least one of the other identified outbound and inbound itineraries may then be received. Embodiments of the present invention also may include transmitting the suggested itineraries and/or the identified itineraries associated with a traveler to the respective traveler for their review and selection. In further embodiments, information associated with the destination location may also be presented when the suggested and/or the identified itineraries are presented.

Changes to the indication regarding the relative weight between schedule and price for at least one of the travelers and/or at least one of the travel itineraries may be received in certain embodiments of the methods and systems of the present invention. The identified itineraries may then be accessed and at least one modified suggested itinerary between the destination location and at least one of the origin locations may be determined based upon the received changes, and may replace the suggested itinerary.

The total price for all of the suggested itineraries and/or the price for each suggested itinerary for each traveler may be determined. In addition, if one or more of the suggested itineraries are replaced with other identified itineraries, then the total price and individual prices for the resulting selected itineraries may be determined. Embodiments of the methods and systems of the present invention also include a determination of the amount of time between when any two travelers arrive at or depart from the destination location. For example, a determination of the amount of time between when each traveler arrives at the destination location and when the last traveler arrives at the destination for each suggested outbound itinerary may be made. Similarly, a determination of the amount of time between when each traveler departs the destination location and when the first traveler departs the destination location for each suggested inbound itinerary may be made. In one embodiment, the suggested outbound and inbound itineraries are the itineraries in which the amount of time between the arrival times and/or departure times of a respective traveler and at least one other traveler are minimized. Again, if one or more of the suggested itineraries are replaced with other identified itineraries, then the time amounts for the resulting selected itineraries may be determined.

Further embodiments of the methods and systems for coordinating travel itineraries may include receiving hotel and/or car rental information associated with at least one of the travelers. A travel database that includes respective hotel and/or car rental information may be accessed and at least one hotel and/or car rental itinerary, respectively, may be identified based upon the received information. The identified hotel and/or car rental itineraries, respectively, may be presented for review, and an indication of a selected hotel and/or car rental itinerary, respectively, may then be received.

The methods and systems of the present invention may also receive payment information regarding how the travel costs for each traveler are to be paid in some embodiments. Billing information may then be transmitted to the appropriate travelers or other entity or individual based upon the contents of the payment information.

Thus, the methods and systems for coordinating outbound and inbound itineraries for multiple travelers according to the various embodiments of the present invention provide automated techniques for providing a travel organizer and/or individual travelers with accurate and timely travel itinerary suggestions and options that best meet their travel criteria, such that the coordination of outbound and inbound travel itineraries for travelers from different origin locations traveling to the same destination location can more easily obtain the travel itineraries that will permit them to arrive at and/or depart from the destination location at similar times. Additionally, the embodiments of the methods and systems of the present invention provide travel organizers and/or travelers with the ability to review the various travel options and easily change their travel itineraries. As such the methods and systems of the present invention are much less time-consuming and less error-prone than manual searching, identification and coordination of such travel itineraries.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a representative display, provided according to one embodiment of the present invention, presenting suggested itineraries that most closely meet the criteria entered by the travel organizer in FIG. 2 and presenting further options regarding the selection of specific itineraries and payment options;

FIG. 4 is a representative display, provided according to one embodiment of the present invention, presenting all of the identified itineraries between an origin and a destination location; and FIG. 5 is a representative display, provided according to one embodiment of the present invention, transmitting and presenting the details of the travel information of selected itineraries associated with a traveler along with billing information.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

According to the present invention, the methods and systems for coordinating the travel itineraries of multiple travelers, who are leaving from more than one origin location, but are arriving at the same destination location, provide automated techniques for quickly and accurately determining which travel itineraries for each traveler best meet the specified criteria for the trip. For example, the methods and systems of the present invention permit a travel organizer to specify certain travel criteria for a trip, such as the date(s) of travel and the relative importance between the travelers arriving at the destination location at as close to the same time as possible (i.e. the schedule) and the overall price of the itineraries for all of the travelers (i.e. the price). The methods and systems then provide a set of suggested travel itineraries that most closely meets the specified criteria, in addition to providing the amount of time between when any two travelers arrive at and/or leave from the destination location, and the overall price or individual prices for each traveler. Furthermore, the travel coordination techniques provide flexibility by allowing the organizer and/or the travelers to view all of the possible itineraries and replace one or more of the suggested itineraries, then recalculate the time amounts and the price(s).

Figure 1:
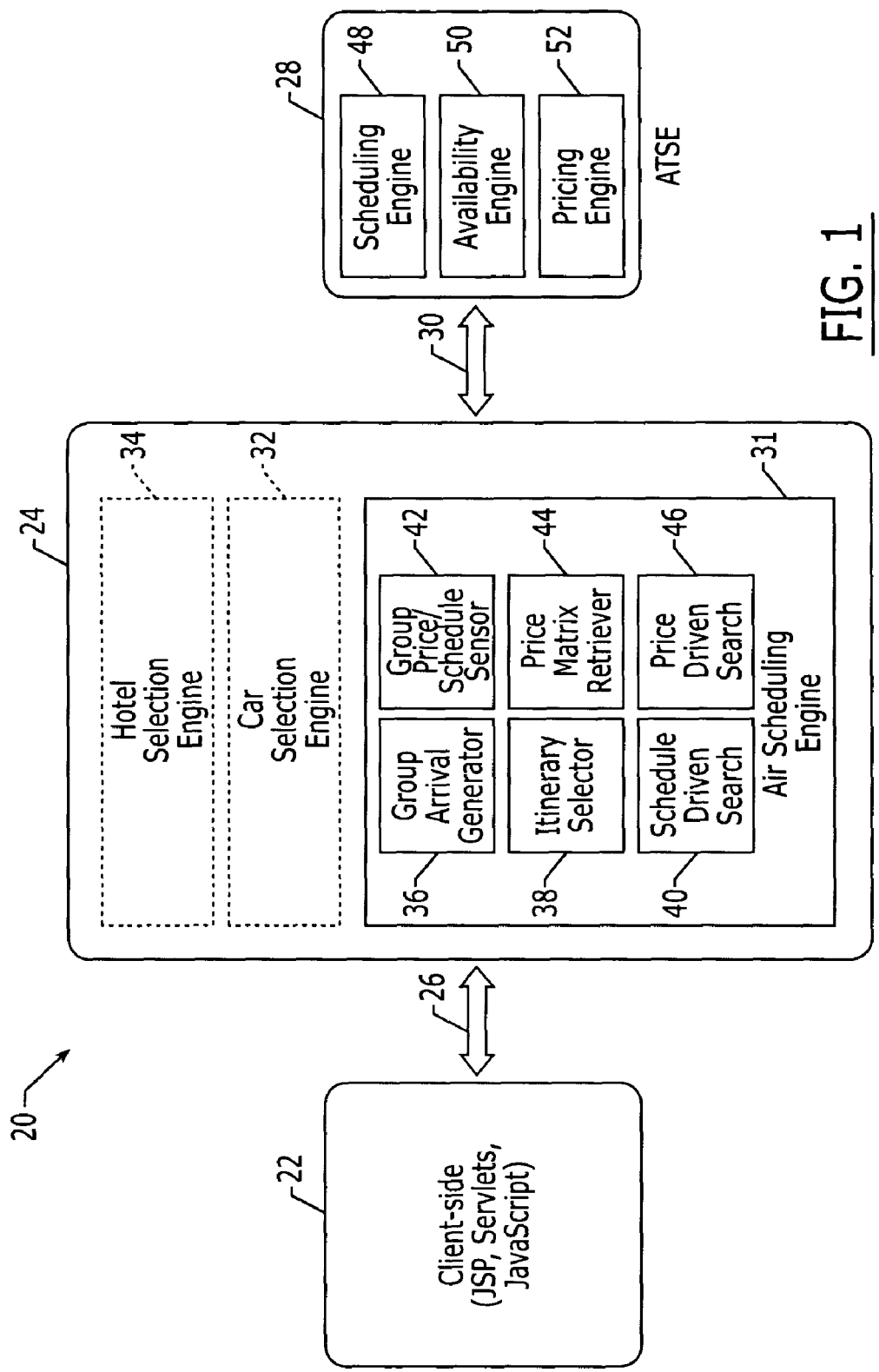
FIG. 1 is a diagram of one example of the network elements that may be utilized to implement the method and system of the present invention.

FIG. 1 is a network diagram of the method and system 20 for coordinating outbound and inbound travel itineraries of one embodiment of the present invention. The system 20 typically includes at least one client element 22 and at least one server connected via at least one computer network 26. For example, the server may be a web server and an application server that may be located on the same physical device or the web server may be separate from and in communication with the application server via the Internet, intranet or any other computer network. The system 20 also generally includes at least one processing element 24. As shown in FIG. 1, the processing element(s) 24 of one embodiment may be embodied by the server, such as the web server and/or the application server. The client element(s) 22 and the processing element(s) 24 and, in one embodiment, the web and application server(s) may be distributed as parts of different workstations, computers, servers or computing devices that may be in different physical locations and in communication with each other via the Internet, intranet or other computer network(s) 26. To be consistent, the discussion hereinafter refers to the different elements of the system 20 as being distributed, unless otherwise stated. In an alternative embodiment, however, the client element(s) 22 and the processing element(s) 24 may be part of a single workstation, computer, server or other computing device and, as such, may communicate with each other via internal transmissions.

The database 28 of the travel itinerary coordination system 20 may be part of one or more of the client element(s) 22, the server, and/or one or more of the processing element(s) 24, or most likely, may be separate from the client element(s) 22, the server, and the processing element(s) 24 and in communication with one or all of the elements via the Internet, intranet or other computer network(s) 30. Regardless of the configuration, the database 28 is accessed by other elements of the travel itinerary coordination system 20 via an interface, such as, but not limited to, a Common Object Request Broker Architecture (CORBA), active data object (ADO) interface or open database connectivity (ODBC) interface.

The client element(s) 22 represent the device or devices that users of the travel itinerary coordination system 20 may utilize to perform their duties regarding the travel data, such as to request inbound and/or outbound itineraries for travelers arriving in one destination location from more than one origin location, and/or to select particular inbound and/or outbound itineraries. The client element(s) 22 may be a laptop computer, a personal computer or workstation, networked personal computers or workstations, or any other type of computing device or configuration operating on any type of computer platform and capable of communications with the server(s). For example, the client element(s) 22 may support a browser interface to permit communications with the server(s). The browser interface is generally an Internet browser, but other browser interfaces capable of appropriately displaying the travel data, soliciting user input, and communicating with the computer network 26 may be utilized if desired. The system 20 may include many client elements 22 such that many users may utilize the travel itinerary coordination system 20. The client element(s) 22 may physically be located anywhere as long as the client element(s) 22 are in communication with the processing element(s) 24 via the Internet, intranet or other computer network 26.

As described above, the processing element(s) 24 of one advantageous embodiment include a web and application server, which may utilize any modem operating system, such as, but not limited to, Microsoft Windows, UNIX, or Linux, and any modem web development platform, such as, but not limited to, JAVA, commercially available from Sun Microsystems, Inc. One or more application program(s) may reside on the web and application server(s). For example, in the embodiment of the network architecture diagram of FIG. 1, the processing element(s) 24 include an Air Scheduling Engine 31, a Car Selection Engine 32, and a Hotel Selection Engine 34. Furthermore, the Air Scheduling Engine 31 application program shown in FIG. 1 may include various modules, such as, but not limited to a Group Arrival Generator 36, an Itinerary Selector 38, a Schedule Driven Search 40, a Group Price/Schedule Sensor 42, a Price Matrix Retriever 44, and a Price Driven Search 46. These modules and engines are generally embodied by software, but may be a combination of hardware and software, if desired. Although the specific embodiment described with respect to FIGS. 1–6 involves air travel, the systems and methods of the present invention also encompass the coordination of any other type of travel or combination of types of travel.

Among other functions, the application program(s) provide the information/instructions required to perform a task and/or provide the requested information regarding particular travel itineraries to the client element(s) 22 in any appropriate form, such as, but not limited to, a web page form having predefined fields. The form may be viewed by the user as "screens" via client element(s) 22 and the browser interface including, for example, a display. As known to those skilled in the art, the screens may be interactive and prompt the user for the action or information necessary for the travel itinerary coordination system 20 to request, provide and allow selection of certain travel itineraries. After the user submits responses to the prompts provided by a screen and/or selects certain options presented on the screen, the application program(s) can determine the content and prompts to be provided by successive screens. The application program(s) may access/query the database 28 to provide the content for any of the screens, based upon the actions taken by the user and/or the request of the user. For example, if a user, such as a travel organizer, who may or may not be a traveler themselves, requests certain travel itineraries based upon certain travel criteria for multiple travelers, the application program(s) receive the request from the user via a screen, query the database 28 for the requested information, populate and format another screen containing the requested information, and submit the screen to the client element(s) 22 for viewing by the user, such as the travel organizer, and, optionally, one or more of the travelers, via the browser interface. Furthermore, if the particular user is to perform a task regarding the presented travel itineraries, such as selecting certain travel itineraries or providing payment information for the travel costs for one or more of the travelers, the application program(s) provide a screen to the user containing the information from the database associated with the task and prompt the user to perform the task. The information requested and received from the database 28 may then be stored in the processing element(s) 24 or in a separate storage element, such that future requests for the same information may be obtained quickly from the processing element(s) 24 and/or the storage element, instead of having to query the database 28 again.

The database 28 may contain a variety of stored information, including the travel data, such as, but not limited to, schedules for one or more types of travel over a period of time, availability of the travel for each schedule, and pricing of the travel for each schedule. For example, in FIG. 1, database 28 may be a global database system (GDS) or a computerized reservation system (CRS) as are known to those skilled in the art. Alternatively, the database may be an air travel database, such as an Air Travel Shopping Engine (ATSE), which contains a Scheduling Engine 48, an Availability Engine 50, and Pricing Engine 52. As used herein, the term itinerary is information that is returned from database 28, which includes schedule, availability and pricing information for a particular type of travel. The database may be any type of modem database, such as Sequel or Oracle. The data may be stored in tables in the database or in any other format known to those skilled in the art.

Figure 2:
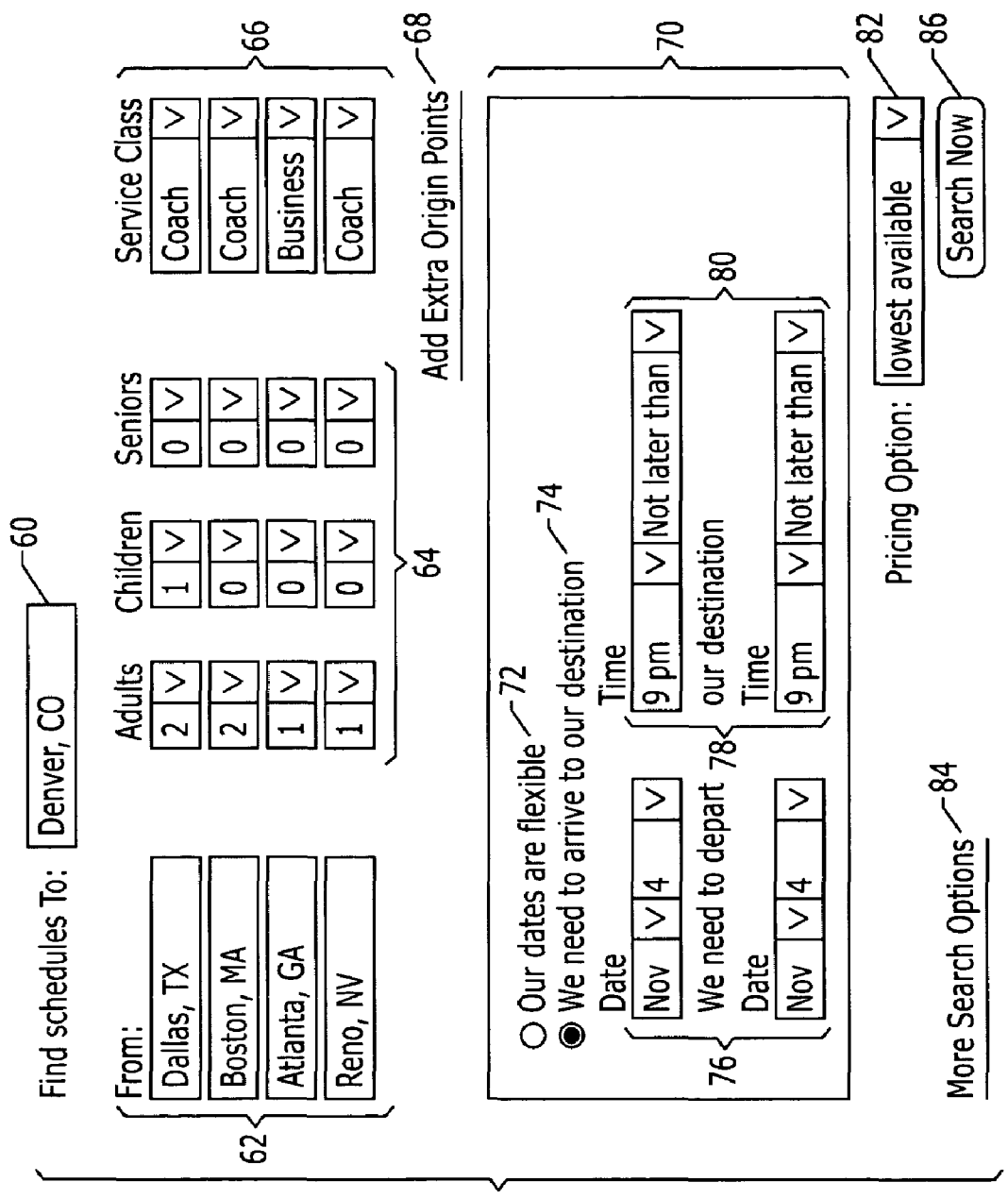
FIG. 2 is a representative display, provided according to one embodiment of the present invention, in which a travel organizer may enter a destination location, multiple origin locations and other travel information associated with two or more travelers.

FIG. 2 illustrates a set of general options and prompts that may be presented to a user of the method and system 20 of the present invention. For example, in FIG. 2, a user, such as a travel organizer, is prompted to enter a destination location in the box 60 that follows the words "Find schedules To:", which is Denver, Colo. in this example. A user is further prompted to enter the origin locations for the travelers in the boxes 62, which are Dallas, Tex., Boston, Mass., Atlanta, Ga., and Reno, Nev. in this example. The user is also prompted to select the number and type, i.e., adults, children or seniors, of people that are traveling from each origin location in the boxes 64. For instance, in the example of FIG. 2, the user has indicated that 2 adults and 1 child will be traveling from Dallas, 2 adults will be traveling from Boston, 1 adult will be traveling from Atlanta, and 1 adult will be traveling from Reno. To enter the numbers in the boxes 64, a user may select the box and utilize a keyboard associated with a client element 22 to enter the desired number in the box or select the arrow to the right of the box, such as with a mouse or other selection device associated with a client element 22, which may provide a list of all of the options for the numbers that may be entered into the box, then select the desired number from the list.

The user, such as a travel organizer, may also be prompted to enter the class of travel for all or each of the travelers from each origin location. The example of FIG. 2 illustrates options in which the user is prompted to enter a class of travel for all of the travelers from each origin location in boxes 66. For instance, in the example of FIG. 2, the class of travel entered for all of the travelers from Dallas, Boston and Reno is coach class, while the class of travel entered for the traveler from Atlanta is business class. Again, to enter the class in the boxes 66, a user may select the box and utilize a keyboard associated with a client element 22 to enter the desired class in the box or select the arrow to the right of the box, such as with a mouse or other selection device associated with the client element 22, which may provide a list of all of the options for the service class that may be entered into the box, then select the desired class from the list. An option to add additional origin points may also be presented to the user, such as the option 68 shown in the FIG. 2 example. If a user selects this option, such as with a mouse or other selection device associated with a client element 22, more boxes 62, 64, and 66 may be presented to the user. For instance, additional boxes may appear below the existing boxes 62, 64, and 66 shown in FIG. 2.

Furthermore, the user may be prompted to enter the desired dates and times for travel. As shown in segment 70 of the example of FIG. 2, the user may select a option 72 indicating that the travelers are flexible concerning their travel dates or the user may select option 74 and indicate the exact date and/or time that the travelers wish to arrive at and depart from their destination. Specifically, the user may enter the exact arrival and departure dates in the boxes 76, as shown in FIG. 2, in the same way as explained above with respect to boxes 62, 64, and 66. The user may also enter arrival and departure times in the boxes 78. In some embodiments, the user may enter an exact time in the boxes 78, or, as shown in the embodiment of FIG. 2, the user may select the arrow to the right of the box, such as with a mouse or other selection device associated with the client element 22, which may provide a list of all of the times that may be entered into the box, and then select the desired time from the list. In addition, in the embodiment shown in FIG. 2, the user may select certain phrases or words from boxes 80 that further define the desired arrival and departure times. For example, in the embodiment of FIG. 2, the user may select among "Not later than," or "Approximately" to further define the desired arrival time, and "Not earlier than," or "Approximately" to further define the desired departure time. If "Not later than" or "Not earlier than" is selected, then itineraries that provide arrival or departure times, respectively, as close as possible to the selected time without any arrival times that are earlier than or later than the selected time, respectively, are desired. If "Approximately" is selected, then itineraries that provide arrival or departure times as close as possible to the selected time, whether before or after the selected time are desired. Thus, in the embodiment of FIG. 2, the user has indicated that the travelers should arrive at their destination not later than 9 pm on November 4 and should depart from their destination not earlier than 2 pm on November 10.

The pricing option box 82 also permits the user, such as the travel organizer, to indicate the relative importance of the travel price to the travel schedule. Thus, the user may select certain phrases from box 82, which may be listed when the user selects the arrow to the right of the box, as described hereinabove. For example, in the embodiment of FIG. 2, the user may select among the phrases "lowest available" or "unrestricted" to indicate how important the price of travel is compared with the schedule of travel. A selection of the "lowest available" pricing option indicates that the lowest price itineraries that also meet the date and time requirements are desired, but that the desired itineraries do not have to be the closest to the date and time requirements. A selection of the "unrestricted" pricing option indicates that the itineraries that meet the date and time requirements as closely as possible, regardless of the price, are desired. As such, the amounts of time between when the travelers arrive at or depart from the destination may be larger when the "lowest available" pricing option is selected than the amounts of time between when the travelers arrive at or depart from the destination when the "unrestricted" pricing option is selected. In the embodiment of FIG. 2, the user has indicated that the lowest available pricing is desirable, such that the travel itinerary coordination system 20 will find the lowest cost travel itineraries that will still arrive at and depart from the destination location within the desired timeframes, but may not be the itineraries that most closely meet the timeframes.

The "more search options" selection 84 expands the search options that the user may enter to further define the user's and/or the traveler's desires regarding the travel itineraries of one or all of the travelers. For example, by selecting the "more search options" selection 84, the user may be presented with the ability to select the service class for each traveler, not just for all of the travelers from one origin, as shown in FIG. 2. The user may also be presented with options to further define the desired length of travel for one or more of the travelers. For example, the user may be permitted to indicate the maximum number of connections, if any, each traveler should have in the respective traveler's itinerary. These options also may include options for entering ground transportation, such as car rental, requirements for one or more of the travelers and lodging, such as hotel rental, requirements for one or more of the travelers. Further options may include, but are not limited to, options to indicate the desired carrier for each traveler, each traveler's email address, and/or pricing options for each traveler. The options described above are examples of general options that may be available to users of the system 20. Other options may be added or the options described above may be combined in other embodiments of the system 20 of the present invention. Once the user has entered all of the information regarding the travel and the travelers, the user may select the "search now" box 86 to initiate a search by the travel itinerary coordination system 20 for travel itineraries that best match the information.

The travel itinerary coordination method and system 20 initiate the search by requesting, from the travel database 28, all of the travel itineraries that most closely meet the requirements entered by the user, such as the travel organizer, as described above. In transmitting any of the requests discussed herein, one request containing all of the desired information may be transmitted to the database 28, or separate requests for each origin location or each traveler may be transmitted to the database.

The information entered by the user, such as the travel organizer, in FIG. 2 is therefore transmitted to the processing element 24 that then transmits the information to the travel database 28. In the discussion that follows, a specific embodiment of the travel itinerary coordination method and system 20 is described, in which air travel itineraries are coordinated utilizing specific modules of the processing element 24, and in particular, the air scheduling engine 31, and the database 28. The present invention, however, is not limited to this embodiment and may utilize other types of travel itineraries and other hardware and software known to those skilled in the art to accomplish the same results without departing from the spirit and scope of the present invention. For example, car rental and/or hotel rental may also be coordinated by the travel itinerary coordination method and system 20 of the present invention by utilizing one or more application program in the car selection engine and/or the hotel selection engine 34, respectively.

In the example of the embodiment of the system 20 illustrated by FIG. 1, the travel database 28 utilizes the scheduling engine 48 to identify all of the outbound and inbound itineraries between each origin and the destination that meet the date and time requirements and any other requirements as closely as possible. If more specific requirements were also entered by the travel organizer for one or more travelers, such as a specific airline or maximum number of connections, then the scheduling engine 48 also considers those requirements when identifying the itineraries. If, however, fewer than a minimum number of itineraries are identified that meet the requirements, the scheduling engine 48 will identify other itineraries that meet all but one or more of the requirements. For example, if a particular traveler requires or prefers a specific airline and direct flights, but the scheduling engine 48 identifies no itineraries or less than a minimum number of itineraries meeting those requirements on the dates and at the times requested, then the scheduling engine 48 will look to itineraries of other airlines and/or connecting flights that still meet the requested dates and times.

Once all of the outbound and inbound itineraries between each origin and the destination that meet the date and time requirements and any other requirements as closely as possible are identified, then the travel database 28 also obtains the availability of those itineraries from the availability engine 50. For example, the availability engine 50 checks to determine whether each of the flights has one or more available seats for the traveler(s). In addition, the availability engine 50 may check to determine whether each of the flights has seats available in the class of service specified for each traveler that may potentially book the flight. If one or more of the flights do not have any seats available, do not have enough seats available for all of the travelers that may potentially book the flight, or do not have the desired class of service seats available, then the respective itineraries may be flagged to indicate the lack of availability or the respective itineraries may be deleted from the list of itineraries that the scheduling engine 48 obtained.

The prices of the identified itineraries may then be obtained. The price may be obtained in any conventional manner. For instance, in the embodiment of FIG. 1, the pricing engine 52 of the database 28 provides one or more price matrix that includes the prices for each inbound itinerary with any outbound itinerary and each outbound itinerary with any inbound itinerary. The price matrix or matrices are then transmitted to the Price Matrix Retriever 44 of the processing element 24.

The itineraries between each origin location and the destination location then may be transmitted to the processing element 24, in particular, the air scheduling engine 31. In the embodiment of the system 20 of FIG. 1, the Group Arrival Generator 36 receives the itineraries and creates an n×n matrix of the itineraries, where n=the number of travelers. The matrix contains each of the itineraries, and for each itinerary associated with an origin, the elapsed time (et), which, for outbound itineraries, is the amount of time between when the traveler arrives at the destination and when the traveler departed from the origin, and, for inbound itineraries, is the amount of time between when the traveler arrives at the origin and when the traveler departed from the destination. The outbound and inbound itineraries having the minimum et are determined, then the Δet=et−minimum et for each itinerary is calculated and associated with the respective itinerary. With respect to the embodiment of the system 20 illustrated in FIG. 2, all of the et determinations and computations are performed by the Itinerary Selector 38. The price for each outbound and inbound itinerary is then obtained from the Price Matrix Retriever 44 and associated with each itinerary. Thus, all of the identified itineraries and their prices are stored in the processing element 24 and/or in a storage element in communication with the processing element 24, such that the system 20 does not have to access the travel database 28 if the travel organizer and/or any of the travelers desire to modify the relative weight assignment between schedule and price or to view all of the identified itineraries.

Groups of outbound itineraries and groups of inbound itineraries in which each group has one itinerary associated with each traveler are then created by the Group Price/Schedule Sensor 42. To create the groups, first an empty list of labels is created for each arrival time slot, where there is one arrival time slot for each arrival time of each of the itineraries associated with the same origin location. Thus, a label is created for each itinerary that arrives at or before the arrival time slot. For example, if there are three itineraries from an origin to a destination and itinerary 1 arrives at the destination at 8 am, itinerary 2 arrives at the destination at 9 am, and itinerary 3 arrives at the destination at 10 am, then only itinerary 1 will have a label for the 8 am time slot, itineraries 1 and 2 will have labels for the 9 am time slot, and itineraries 1, 2 and 3 will have labels for the 10 am time slot. Each label contains at least (1) the Δet+the amount of time between the arrival time slot and the arrival time for the itinerary (i.e., the waiting time); (2) price and (3) itinerary identifier.

For instance, assume that itineraries 1, 2 and 3 departing from origin 1 have the following details:

| Itinerary | Identifier | Departing Time | Arrival Time | Stops | et (minutes) | Price |
|---|---|---|---|---|---|---|
| 1 | AA1 | 5:30 am | 8:00 am | 1 | 150 | $150 |
| 2 | AA2 | 5:30 am | 9:00 am | 1 | 210 | $130 |
| 3 | AA3 | 8:00 am | 10:00 am | 0 | 120 | $200 |

Thus, itinerary 3 has the minimum et at 120 minutes. Itinerary 1 has a Δet=30, and itinerary 2 has a Δet=90.

For the 8:00 am time slot, the label for itinerary 1 is:

| | |
|---|---|
| (1) | 30 |
| (2) | 150 |
| (3) | AA1 |

For the 9:00 am time slot, the labels for itinerary 1 and itinerary 2, respectively are:

| | |
|---|---|
| (1) | 90 |
| (2) | 150 |
| (3) | AA1 |

| | |
|---|---|
| (1) | 90 |
| (2) | 130 |
| (3) | AA2 |

Because more than one label exists for this time slot, the Group Price/Schedule Sensor 42 determines whether to eliminate any of the itineraries. Thus, an itinerary and the associated label may be eliminated if the time amount in (1) for a respective itinerary is greater than or equal to the time amount in (1) for the other itineraries and the price in (2) for the respective itinerary is greater than the price in (2) for the other itineraries. Likewise, an itinerary and the associated label may be eliminated if the price in (2) for the respective itinerary is greater than or equal to the price in (2) for the other itineraries and the time amount in (1) for a respective itinerary is greater than the time amount in (1) for the other itineraries. For example, regarding the labels in the 9:00 am time slot, the AA1 itinerary may be eliminated because the time amount in (1) for the AA1 itinerary is the same as the time amount in (1) for the AA2 itinerary and the price in (2) for the AA1 itinerary is greater than the price in (2) for the AA2 itinerary. Once an itinerary has been eliminated for one time slot, it is also eliminated in any subsequent time slots. Thus, a label for itinerary 1 (i.e. AA1 ) will not be created for any subsequent time slots.

For the 10:00 am time slot, the labels for itinerary 2 and itinerary 3, respectively are:

| | |
|---|---|
| (1) | 150 |
| (2) | 130 |
| (3) | AA2 |

| | |
|---|---|
| (1) | 0 |
| (2) | 200 |
| (3) | AA3 |

Following the rules set forth above, neither of these labels and associated itineraries may be eliminated because while the time amount in (1) for the AA2 itinerary is greater than the time amount in (1) for the AA3 itinerary, the price in (2) for the AA2 itinerary is less than the price in (2) for the AA3 itinerary. Likewise, while the price in (2) for the AA3 itinerary is greater than the price in (2) for the AA2 itinerary, the time amount in (1) for the AA3 itinerary is less than the time amount in (1) for the AA2 itinerary. Thus, a matrix for origin 1 is created in which the 8:00 am time-slot has one label (i.e., the AA1 itinerary), the 9:00 am time slot has one label (i.e., the AA2 itinerary), and the 10:00 am time slot has two labels (i.e., the AA2 and AA3 itineraries). Such a matrix is created for each origin location.

Once the matrices for each origin location are created as described above, a matrix is created for the various groups of itineraries in which each group contains an itinerary for each traveler associated with an origin location. For example, assume that itineraries 1, 2 and 3 departing from origin 2 have the following details:

| Itinerary | Identifier | Departing Time | Arrival Time | Stops | Et (minutes) | Price |
|---|---|---|---|---|---|---|
| 1 | DL1 | 7:40 am | 8:50 am | 1 | 70 | $120 |
| 2 | DL2 | 7:20 am | 9:30 am | 1 | 130 | $100 |
| 3 | DL3 | 10:10 am | 11:00 am | 0 | 50 | $20 |

Thus, itinerary 3 has the minimum et at 50 minutes. Itinerary 1 has a $\Delta et=20$, and itinerary 2 has a $\Delta et=80$.

Thus, for the 10:00 am time slot, the labels for itinerary 1 and itinerary 2 from origin 2 are:

| (1) | 90 |
|---|---|
| (2) | 120 |
| (3) | DL1 |

| (1) | 110 |
|---|---|
| (2) | 100 |
| (3) | DL2 |

For an 11:00 am time slot, the labels for itinerary 1, itinerary 2 and itinerary 3 from origin 2 are:

| (1) | 90 + 60 = 150 |
|---|---|
| (2) | 120 |
| (3) | DL1 |

| (1) | 110 + 60 = 170 |
|---|---|
| (2) | 100 |
| (3) | DL2 |

| (1) | 0 |
|---|---|
| (2) | 20 |
| (3) | DL3 |

Following the rules set forth above, neither of the labels and associated itineraries may be eliminated for the 10:00 am time slot because while the time amount in (1) for the DL2 itinerary is greater than the time amount in (1) for the DL1 itinerary, the price in (2) for the DL2 itinerary is less than the price in (2) for the DL1 itinerary. Likewise, while the price in (2) for the DL1 itinerary is greater than the price in (2) for the DL2 itinerary, the time amount in (1) for the DL1 itinerary is less than the time amount in (1) for the DL2 itinerary. Thus, in creating the group matrix, two labels for origin 1 (i.e., the AA2 and AA3 itineraries) and two labels for origin 2 (i.e., the DL1 and DL2 itineraries) may be used to create a group label for the 10:00 am time slot.

However, for the 11:00 am time slot both the DL1 and DL2 itineraries may be eliminated because the time amount in (1) for the DL3 itinerary is less than the time amount in (1) for either the DL1 or DL2 itineraries and the price in (2) for the DL3 itinerary is less than the price in (1) for either the DL1 or DL2 itineraries.

Thus, to create a group label for the 10:00 am time slot, the cross-product of the two labels for origin 1 and the two labels for origin 2 is determined by summing the times in (1) and the prices in (2) for the various combinations of itineraries from each origin. For example, four group labels may be created from the two labels for origin 1 and the two labels for origin 2 as follows:

| (1) | 150 + 90 = 240 |
|---|---|
| (2) | 130 + 120 = 250 |
| (3) | AA2/DL1 |

| (1) | 150 + 110 = 260 |
|---|---|
| (2) | 130 + 100 = 230 |
| (3) | AA2/DL2 |

| (1) | 0 + 90 = 90 |
|---|---|
| (2) | 200 + 120 = 320 |
| (3) | AA3/DL1 |

| (1) | 0 + 110 = 110 |
|---|---|
| (2) | 200 + 100 = 300 |
| (3) | AA3/DL2 |

Following the rules set forth above, none of these labels and associated itineraries may be eliminated. Thus, in the group matrix, four labels are included in the 10:00 am time slot (i.e., the AA2/DL1 itinerary, the AA2/DL2 itinerary, the AA3/DL1 itinerary, and the AA3/DL2 itinerary).

For the 11:00 am time slot, all of the labels from the 10:00 am time slot may transfer over with the only change being a 120 minute (i.e., the difference between 10:00 am and 11:00 am for each itinerary) addition to the time amounts in (1) of each of the labels, as shown below:

| (1) | 240 + 120 = 360 |
|---|---|
| (2) | 250 |
| (3) | AA2/DL1 |

| (1) | 260 + 120 = 380 |
|---|---|
| (2) | 230 |
| (3) | AA2/DL2 |

| | |
|---|---|
| (1) | 90 + 120 = 210 |
| (2) | 320 |
| (3) | AA3/DL1 |

| | |
|---|---|
| (1) | 110 + 120 = 230 |
| (2) | 300 |
| (3) | AA3/DL2 |

Alternatively, if the individual labels for itineraries from origin 2 were determined for an 11:00 am time slot, as shown above, and it is known that the DL3 itinerary eliminates the DL1 and DL2 itineraries for this time slot, then any group label that includes DL1 or DL2 may automatically be eliminated from the 11:00 am time slot for the group matrix. In either situation, the cross-product of the two labels for origin 1 and the DL3 label for origin 2 is determined by summing the times in (1) and the prices in (2) for the various combinations of itineraries from each origin. For example, two group labels may be created from the two labels for origin 1 and the one additional label for origin 2 as follows:

| | |
|---|---|
| (1) | 150 + 60 + 0 = 210 |
| (2) | 130 + 20 = 150 |
| (3) | AA2/DL3 |

| | |
|---|---|
| (1) | 0 + 60 + 0 = 60 |
| (2) | 200 + 20 = 220 |
| (3) | AA3/DL3 |

If the first four group labels (i.e., the AA2 /DL1, AA2 /DL2, AA3 /DL1 and AA3 /DL2 itineraries) were not automatically eliminated for the 11:00 am time slot as described above, then following the rules set forth above, the first four group labels may be eliminated at this point because both the time amounts in (1) and the prices in (2) for the AA2 /DL3 and AA3 /DL3 itineraries are less than the time amounts in (1) and the prices in (2) for the first four group labels. Thus, in the group matrix, two labels are included in the 11:00 am time slot (i.e., the AA2 /DL3 itinerary and the AA3 /DL3 itinerary).

This process continues until the outbound group matrix is populated for each arrival time slot for each itinerary (regardless of the origin). In addition, the same process described above is carried out to create a group matrix for inbound itineraries. In embodiments of the system 20 in which the outbound and inbound itineraries are tied to round-trip pricing that ties a particular outbound itinerary to a particular inbound itinerary, the itinerary labels and group labels may be created as described above, but an estimate, such as an average or mean of the price, use of the highest or lowest price, or any other type of estimate known to those skilled in the art, for each outbound itinerary over all of the possible inbound itineraries to which the outbound itinerary may be tied may be utilized in creating the labels. In the same way, an estimate or average of the price for each inbound itinerary over all of the possible outbound itineraries to which the inbound itinerary may be tied may be utilized in creating the labels. When presenting the prices of particular itineraries to the travel organizer and/or individual travelers, however, the exact pricing for the round trip is utilized. In other embodiments of the system 20, any type of computing known to those skilled in the art may be utilized to take into consideration the possible inbound itineraries when creating the labels for the outbound itineraries and to take into consideration the possible outbound itineraries when creating the labels for the inbound itineraries such that exact pricing is also utilized when creating the labels.

The inbound and outbound group matrices then may be searched by search engines, such as the Schedule Driven Search module 40 and the Price Driven Search module 46, to determine which group of itineraries best meets the group requirements indicated by the travel organizer. For example, if the travel organizer indicated that the schedule of the itineraries is weighted heavier than the price of the itineraries, such as by selecting "unrestricted" in the pricing option box 82, then the Schedule Driven Search module 40 searches the groups of itineraries for the group that has the least total waiting time in (1) of the labels. For the labels included in the group matrix described above, (i.e., the AA2 /DL1, AA2 /DL2, AA3 /DL1 and AA3 /DL2 itineraries for the 10:00 am time slot and the AA2 /DL3 and AA3 /DL3 itineraries for the 11:00 am time slot) the Schedule Driven Search module 40 would select AA3 /DL3 itinerary in the 11:00 time slot because it has the smallest amount of time in (1) of the labels. If the travel organizer indicated that the price of the itineraries is weighted heavier than the schedule of the itineraries, such as by selecting "lowest available" from the pricing option box 82, then the Price Driven Search module 46 searches the groups of itineraries for the group that has the lowest total price in (2) of the labels. For the labels included in the group matrix described above, (i.e., the AA2 /DL1, AA2 /DL2, AA3 /DL1 and AA3 /DL2 itineraries for the 10:00 am time slot and the AA2 /DL3 and AA3 /DL3 itineraries for the 11:00 am time slot) the Price Driven Search module 46 would select AA2 /DL3 itinerary in the 11:00 time slot because it has the lowest total price in (2) of the labels. Whichever group is chosen based upon the weighting the travel organizer indicated is then the suggested group of itineraries.

In other embodiments of the method and system 20 of the present invention, the travel organizer may select an intermediate weighting between price and schedule if an intermediate total waiting time and/or an intermediate total price is desired. For example, the pricing option box 82 may present one or more options that indicate an intermediate weighting between price and schedule is desired and the Schedule Driven Search module 40, the Price Driven Search module 46, combination of the Schedule Driven Search module 40 and the Price Driven Search module 46, or a separate intermediate search module may search the groups of itineraries for the group that most closely meets the desired weighting between schedule and price indicated by the travel organizer. To determine which group of itineraries most closely meets the desired weighting, the system 20 may normalize the differential in price and time of each group of itineraries as known to those skilled in the art. For instance, the differential in price and time of each group of itineraries for each arrival time slot may be determined as described above in creating the inbound and outbound group matrices. The differentials then may be scaled. The price portion of the scaled differentials may be multiplied by the desired weighting of price, and the time portion of the scaled differentials may be multiplied by the desired weighting of the schedule. The weighted price and time portions then may be summed, and this number for each group of itineraries may be compared, such that the lowest number is associated with the group of itineraries that most closely meets the desired weighting between schedule and price indicated by the travel organizer.

As illustrated in the embodiment of FIG. 3, the suggested group of itineraries is listed and displayed for the travel organizer to view. Thus, the processing element 24 transmits the information regarding the suggested group of itineraries to the client element(s) 22 via the network(s) 26. In this embodiment, the tables 90 and 92 are populated with the details of each outbound and inbound itinerary, respectively, from and to, respectively, each origin location. As shown in FIG. 3, the outbound group of itineraries may be sorted based upon the arrival times at the destination and the inbound group of itineraries may be sorted based upon the departure times from the destination. In addition, the individual prices for the each outbound and inbound itinerary for each origin is listed in column 94, and the total price for all of the itineraries from all of the origins is listed in box 96.

Modifications to the itineraries may be made in at least two ways. One way is by the group arrival controls 98 and/or the group departure controls 100. As such, for all of the inbound and/or outbound itineraries, changes may be made as a whole by way of the selection arrows or by other comparable controls. For example, regarding the embodiment of FIG. 3, if the "Earlier Arrival" or "Later Arrival" arrows are selected from the group arrival controls 98, then the processing element 24 accesses the stored group matrix of groups of itineraries to find a group, if any, in which the last traveler arrives the next closest time that is earlier than 8:36 pm or later than 8:36 pm, respectively. If the same arrow is selected again, then the group with the next closest time will be selected, and so on. If the "Low Price/More Wait" arrow is selected from the group arrival controls 98, then the processing element 24, particularly the Price Driven Search module 46, accesses the stored groups of itineraries to find a group, if any, that has the next lower price than the suggested group. If the "More Price/Low Wait" arrow is selected from the group arrival controls 98, then the processing element, particularly the Schedule Driven Search module 40, accesses the stored groups of itineraries to find a group, if any, that has the next lower total wait time than the suggested group. Once the desired group is found, then the processing element 24 transmits the information to the client element(s) 22 via the network(s) 26 to display the results.

Another way to modify the suggested group of itineraries is to select the "Change Flight" button 102 associated with the individual inbound or outbound flight that is to be modified. For example, in the embodiment of FIG. 3, if the button 102 associated with the flight from Atlanta to Denver is selected, a request is transmitted to the processing element 24 to provide all of the identified itineraries from Atlanta to Denver. The processing element 24 accesses the matrix that contains all of the identified itineraries and extracts the Atlanta to Denver itineraries to transmit to the client element(s) 22 via the network 26. In addition, the Group Price/Schedule Sensor 42 recalculates each total price and total waiting time, and each change in total price and total waiting time, for the group of outbound itineraries with each identified itinerary, and this information is transmitted to the client element(s) 22 as well. Thus, FIG. 4 illustrates the display that a travel organizer and/or individual traveler views when all of the identified itineraries are presented. As shown in FIG. 4, the details of each identified itinerary are displayed along with the change in the price and the waiting time, which is based upon when the last person arrives at the destination. For example, the embodiment of FIG. 4 shows that by selecting the DL675 itinerary, the respective traveler would arrive at the destination 28 minutes prior to when the last traveler arrives at the destination. By selecting the AA 3433/545 itinerary, the traveler would arrive at the destination 2 minutes prior to when the last traveler arrives at the destination. Alternatively, by selecting the AA 4335/5656 itinerary, the respective traveler would become the last traveler to arrive at the destination, which would impose an additional waiting time of 84 minutes for all of the other travelers.

The travel organizer may also indicate the method of payment for the travel itineraries. As shown in FIG. 3, the travel organizer may select "Individual Payment" or "Group Payment" in options 104. If the "Individual Payment" option is selected, then each outbound and inbound itinerary is paid by the respective traveler, but if the "Group Payment" option is selected, then the travel organizer will be prompted to enter the payment information to pay for all of the outbound and inbound itineraries. Once the method of payment has been selected, the travel organizer may then select the "View Itinerary" box 106, which provides a display of a detailed list of all of the itineraries for all of the travelers. The travel organizer has the option to modify the individual itineraries of travelers from this display as well, such as by selecting a "Modify" indication associated with a particular itinerary. The identified itineraries may then be presented for the travel organizer to view, along with the changes to the overall price and waiting time that would result if a respective identified itinerary were selected, in the same way as described above regarding the "Change Flight" buttons 102. The travel organizer also may delete any traveler's itinerary at this point, such as by selecting a "Delete" indication.

In addition, if any type of car rental or lodging options were selected by the travel organizer, the detailed itineraries associated with those rentals may be presented along with the travel itineraries. The travel organizer is also prompted to enter personal information regarding the specific travelers associated with each itinerary. For example, the travel organizer may be prompted to enter at least the names and email addresses of each traveler. By entering the email address of each traveler, the system 20 is capable of preparing and sending an email detailing each traveler's itinerary or containing a link to a web page that displays the itinerary information. In addition, the system 20 may create a group email address for each of the travelers and the travel organizer to facilitate communication between and/or among the travelers without having to distribute each traveler's personal information. An example of such an email is shown in FIG. 5, which is discussed further below.

If the group payment option was selected in the display shown in FIG. 3, then the travel organizer may be prompted to enter payment for the cost of all of the itineraries and any car rental or lodging rental. Furthermore, the travel organizer may be permitted to choose the seat assignments for the travelers, such as by selecting a "Choose Your Seats" indication. For example, the system 20 may access the seat assignment map associated with the respective itinerary by transmitting a request to the processing element 24. The processing element 24 then may obtain the seat assignment map from a database that stores the seat assignment map for the particular itinerary, such as a database that may be updated in real-time. Thus, the database is in communication with the processing element 24, such that the database may be part of the processing element 24 or part of any other element in communication with the processing element, such as the travel database 28. Once the seats associated with a particular itinerary are chosen, that information may be updated in the seat assignment map by transmitting the information to the database that may be updated in real-time, such as the travel database 28, via the processing element 24.

As discussed above, the system 20 is capable of preparing an email to each traveler that contains the details of the respective traveler's itinerary or a link to a web page that contains the details. Email 120 of FIG. 5 illustrates such a communication. This email contains a link to a web page that contains the details of the respective traveler's itinerary and the email communicates the group email address that permits each traveler and travel organizer to communicate with the rest of the travelers. When the traveler selects the link to the web page in the email, web page 122 may be displayed to the traveler. As discussed above with respect to the group payment option, the traveler may have the option to modify the itineraries by selecting the "Modify" box 124 or delete the itineraries by selecting the "Delete" box 126 associated with the respective itinerary in the same way the travel organizer could. In addition, the traveler may also be permitted to choose his seats by selecting the "Choose Your Seats" box 128 in the same way described above regarding the travel organizer. Any car rental or hotel rental information is also presented to the traveler via the web page 122 in portion 130. In some embodiments of the method and system 20, the traveler may also be permitted to modify the car rental and/or hotel rental information via the web page 122.

In the example of FIG. 5, the individual payment option was selected, such as by the travel organizer in FIG. 3, such that the car rental and hotel rental information also contains a statement of the respective traveler's share of those costs. Furthermore, because the individual payment option was selected, the web page 122 also contains portion 124 prompting the traveler to enter the payment information. Alternatively, if the individual payment options was not selected, but instead, the traveler's costs were paid under a group payment, which locked in the itineraries as selected by the travel organizer, the traveler may not have the option to modify or delete his itineraries.

Any other type of information may also be transmitted to the user, such as the travel organizer and/or the travelers, via the displays, such as those illustrated in FIGS. 3 and 5. For example, information associated with the destination location, such as advertisements for events or activities at the destination location, may be obtained from the processing element(s) 24 and/or the database 28, and may also be present to the user.

Thus, the method and system 20 for travel itinerary coordination provides accurate and fast techniques to coordinate the travel itineraries of multiple travelers from more than one origin location who are traveling to the same destination location. By permitting an indication of a relative weight between the itineraries schedule and price and options to modify any of the suggested itineraries with other identified itineraries, the method and system also provide flexibility and efficiency that was not possible by the prior art manual coordination techniques.

Some specific examples of implementations of the method and system 20 for travel itinerary coordination include both leisure and business travel. For example, a travel organizer may wish to coordinate the travel itineraries of multiple family members planning to travel to a family reunion from more than one origin location. Because each family member is paying for their own travel and are traveling on their own time, getting the lowest priced travel arrangements is relatively more important to the family members than minimizing the waiting time between the arrival and departure times of the travelers. Thus, utilizing the method and system 20 of the present invention, the travel coordinator can easily enter the trip and traveler information and receive the lowest priced travel itineraries that meet the trip criteria by indicating that the lowest available pricing is desired in the pricing option box 82. If, however, the travel itineraries that are suggested are not agreeable to the travel organizer, the travel organizer can search for alternate flights for one or more of the travelers or request a different group of suggested itineraries via the group travel controls, as illustrated by the example of FIG. 3. In addition, car rental and hotel rental information for the travelers may be coordinated at the same time, such that all of the travel and rental information is easily distributed to all of the family members and split among the family members who save money due to the coordination. The travel organizer can then permit distribution of the respective itineraries to the travelers who can then modify their itineraries, if desired, and pay for the travel individually, such as is illustrated in FIG. 5.

Another example is business travel, such as when a travel organizer is coordinating the travel itineraries of multiple employees planning to travel to a business meeting from more than one origin location. Because the business is paying for the travel costs of all of the travelers and because the travelers will be traveling on business time, minimizing the waiting time as much as possible is relatively more important to the business than the cost of the travel. The travel organizer may then indicate that the schedule is more important by selecting the unrestricted option from the pricing option box 82. If, however, the prices of the travel itineraries that are suggested are too expensive, the travel organizer can search for alternate flights for one or more of the travelers or request a different group of suggested itineraries via the group travel controls, as illustrated by the example of FIG. 3. In addition, the travel organizer can coordinate the car rental and/or hotel rental plans, such that all of the travel and rental information is easily distributed to all of the travelers and paid for by the business, which also saves money due to the coordination.

Event planning may also be easily coordinated via the trip itinerary coordination method and system 20 of the present invention. For example, a travel organizer may coordinate an event, such as a rafting trip, a tour, a sporting event, or any other type of activity, for multiple travelers from different origin locations. Thus, the event is scheduled to begin at a certain date and time, so the travel organizer can find the lowest available pricing or the closest arrival and departure time for the travel itineraries of all of the travelers based upon the indication the travel organizer enters into the pricing option box 82. If the suggested travel itineraries returned to the travel organizer are not satisfactory, then the travel organizer can also search for alternate flights for one or more of the travelers or request a different group of suggested itineraries via the group travel controls, as illustrated by the example of FIG. 3. In addition, the travel organizer can coordinate the car rental and/or hotel rental plans for the travelers, which may provide cost savings due to the coordination. The travel organizer also can select whether each traveler will pay for their own itineraries and other portions of the travel costs or whether one person will pay for all of the travel costs, as illustrated by FIG. 3. For example, the travel organizer may charge certain amounts for the event coordination as a whole or to each individual traveler, which would include each traveler's travel costs, such that the travel organizer pays for all of the travel costs.

The travel organizer can then permit distribution of the respective itineraries to the travelers who can then modify their itineraries, if desired, such as is illustrated in FIG. 5.

Thus, there are many different applications in which the travel itinerary coordination method and system 20 could be utilized to coordinate the travel itineraries of multiple travelers, who are leaving from more than one origin location, but are arriving at the same destination location by providing automated techniques for determining which itineraries for each traveler best meets the specified criteria, such as the relative importance of the travel schedules versus the price, for the trip. A set of suggested travel itineraries that most closely meet the specified criteria are then provided, in addition to the amount of time between when any two travelers arrive at and/or leave from the destination location, and the price. Furthermore, the travel coordination techniques provide flexibility by allowing replacement of one or more of the suggested itineraries with other possible itineraries and recalculation of the time amounts and the price(s).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. Method for coordinating a plurality of outbound and inbound itineraries, comprising:
   receiving a destination location, a plurality of origin locations and other travel information, wherein each origin location is associated with at least one traveler;
   receiving an indication regarding a relative weight between price and schedule for at least some of the outbound and inbound itineraries;
   accessing a travel database comprising at least outbound and inbound itineraries between the destination location and the origin locations;
   identifying at least one outbound and inbound itinerary between the destination location and each origin location from the travel database based upon the travel information;
   labeling the identified itineraries such that each of the identified outbound and inbound itineraries is associated with at least a price and schedule;
   determining a suggested outbound and inbound itinerary from the labeled itineraries between the destination location and each origin location based upon the indication of the relative weight, and
   presenting the suggested outbound and inbound itineraries for review.

2. The method according to claim 1, further comprising:
   receiving an indication that alternative itineraries are desired for at least one of the suggested outbound and inbound itineraries associated with a respective traveler;
   presenting other identified outbound and inbound itineraries between the destination location and an origin location for review if an indication is received that alternative itineraries are desired; and
   receiving an indication of a selection of at least one of the other identified outbound and inbound itineraries.

3. The method according to claim 2, further comprising presenting information associated with the destination location when presenting at least one of the suggested itineraries and the identified itineraries.

4. The method according to claim 1, further comprising determining at least one of a total price for all of the suggested itineraries for all of the travelers and a price for each suggested itinerary for each traveler.

5. The method according to claim 1, further comprising determining an amount of time between when each traveler arrives at the destination location and when the last traveler arrives at the destination location for each suggested outbound itinerary.

6. The method according to claim 1, further comprising determining an amount of time between when each traveler departs the destination location and when the first traveler departs the destination location for each suggested inbound itinerary.

7. The method according to claim 1, further comprising storing the at least one identified outbound and inbound itinerary between the destination location and each origin location.

8. The method according to claim 1, further comprising transmitting at least the suggested itinerary associated with a traveler to the respective traveler.

9. The method according to claim 1, further comprising presenting the identified at least one outbound and inbound itinerary between the destination location and the origin location associated with a traveler to the respective traveler.

10. The method according to claim 9, further comprising:
    receiving changes to at least one of the suggested outbound and inbound itinerary associated with a respective traveler; and
    creating a revised group of itineraries based upon the received changes.

11. The method according to claim 10, further comprising determining at least one of a total price for all of the itineraries and a price for each itinerary in the revised group of itineraries.

12. The method according to claim 10, further comprising determining at least one of an amount of time between when each traveler arrives at the destination location and when the last traveler arrives at the destination location and an amount of time between when each traveler departs the destination location and when the first traveler departs the destination location for each itinerary in the revised group of itineraries.

13. The method according to claim 1, further comprising:
    receiving changes to the indication regarding the relative weight between price and schedule for at least one of the plurality of travel itineraries;
    accessing the identified at least one outbound and inbound itinerary between the destination location and each origin location;
    determining at least one modified suggested itinerary between the destination location and at least one of the origin locations based upon the changes; and
    replacing at least one suggested itinerary with the at least one modified suggested itinerary to create a revised group of suggested itineraries.

14. The method according to claim 13, further comprising determining at least one of a total price for all of the suggested itineraries and a price for each suggested itinerary in the revised group of suggested itineraries.

15. The method according to claim 13, further comprising determining at least one of: (i) an amount of time between when each traveler arrives at the destination location and when the last traveler arrives at the destination location, and (ii) an amount of time between when each traveler departs the destination location and when the first traveler departs the destination location for each suggested itinerary in the revised group of suggested itineraries.

16. The method according to claim 1, further comprising:
receiving payment information regarding how the travel costs for each traveler are to be paid; and
transmitting billing information based upon the payment information.

17. The method according to claim 1, further comprising:
receiving hotel rental information associated with at least one of the travelers;
accessing a travel database comprising hotel rental information for the destination location;
identifying at least one hotel itinerary from the travel database based upon the hotel rental information;
presenting the identified at least one hotel itinerary for review; and
receiving an indication of a selected hotel itinerary from the at least one hotel itinerary.

18. The method according to claim 1, further comprising:
receiving car rental information associated with at least one of the travelers;
accessing a travel database comprising car rental information for the destination location;
identifying at least one car rental itinerary from the travel database based upon the car rental information;
presenting the at least one car rental itinerary for review, and
receiving an indication of a selected car rental itinerary from the at least one car rental itinerary.

19. The method according to claim 1, further comprising providing electronic communication among at least two of a travel organizer and the travelers.

20. A system for coordinating a plurality of outbound and inbound itineraries, comprising:
at least one client element for receiving a destination location, a plurality of origin locations and other travel information, wherein each origin location is associated with at least one traveler, and wherein said at least one client element is also for receiving an indication regarding a relative weight between price and schedule for at least some of the outbound and inbound itineraries;
at least one processing element for accessing a travel database comprising at least outbound and inbound itineraries between the destination location and the origin locations, wherein said at least one processing element is also for identifying at least one outbound and inbound itinerary between the destination location and each origin location from the travel database based upon the travel information, wherein said at least one processing element is for labeling the identified itineraries such that each of the identified outbound and inbound itineraries is associated with at least a price and schedule, and wherein said at least one processing element is further for determining a suggested outbound and inbound itinerary from the labeled itineraries between the destination location and each origin location based upon the indication of the relative weight; and
at least one display element for presenting the suggested outbound and inbound itineraries for review.

21. The system according to claim 20,
wherein said at least one display element is also for presenting other identified outbound and inbound itineraries between the destination location and an origin location for review if an indication is received that alternative itineraries are desired;
wherein said at least one client element is for receiving an indication that alternative itineraries are desired for at least one of the suggested outbound and inbound itineraries associated with a respective traveler, and wherein said at least one client element is also for receiving an indication of a selection of at least one of the other identified outbound and inbound itineraries.

22. The system according to claim 20, wherein said at least one display element is also for presenting information associated with the destination location when presenting at least one of the suggested itineraries and the identified itineraries.

23. The system according to claim 20, wherein said at least one processing element is also for determining at least one of a total price for all of the suggested itineraries for all of the travelers and a price for each suggested itinerary for each traveler.

24. The system according to claim 20, wherein said at least one processing element is also for determining an amount of time between when each traveler arrives at the destination location and when the last traveler arrives at the destination location for each suggested outbound itinerary.

25. The system according to claim 20, wherein said at least one processing element is also for determining an amount of time between when each traveler departs the destination location and when the first traveler departs the destination location for each suggested inbound itinerary.

26. The system according to claim 20, further comprising at least one storage element storing the at least one identified outbound and inbound itinerary between the destination location and each origin location.

27. The system according to claim 20, wherein said at least one processing element is also for transmitting at least the suggested itinerary associated with a traveler to the respective traveler.

28. The system according to claim 20, wherein said at least one display element is also for presenting other identified at least one outbound and inbound itinerary between the destination location and the origin location associated with a traveler to the respective traveler.

29. The system according to claim 28, wherein said at least one client element is also for receiving changes to at least one of the suggested outbound and inbound itinerary associated with a respective traveler, and wherein said at least one processing element is also for creating a revised group of itineraries based upon the received changes.

30. The system according to claim 29, wherein said at least one processing element is also for determining at least one of a total price for all of the itineraries and a price for each itinerary in the revised group of itineraries.

31. The system according to claim 29, wherein said at least one processing element is also for determining at least one of: (i) an amount of time between when each traveler arrives at the destination location and when the last traveler arrives at the destination location, and (ii) an amount of time between when each traveler departs the destination location and when the first traveler departs the destination location for each itinerary in the revised group of itineraries.

32. The system according to claim 20,
wherein said at least one client element is also for receiving changes to the indication regarding the relative weight between price and schedule for at least one of the plurality of travel itineraries; and
wherein said at least one processing element is also for accessing other identified at least one outbound and inbound itinerary between the destination location and each origin location, wherein said at least one processing element is also for determining at least one modified suggested itinerary between the destination location and at least one of the origin locations based upon the changes, and wherein said at least one processing element is also for replacing at least one suggested itinerary with the at least one modified suggested itinerary to create a revised group of suggested itineraries.

33. The system according to claim 32, wherein said at least one processing element is also for determining at least one of a total price for all of the suggested itineraries and a price for each suggested itinerary in the revised group of suggested itineraries.

34. The system according to claim 32, wherein said at least one processing element is also for determining at least one of: (i) an amount of time between when each traveler arrives at the destination location and when the last traveler arrives at the destination location, and (ii) an amount of time between when each traveler departs the destination location and when the first traveler departs the destination location for each suggested itinerary in the revised group of suggested itineraries.

35. The system according to claim 20, wherein said at least one processing element is also for receiving payment information regarding how the travel costs for each traveler are to be paid, and wherein said at least one processing element is also for transmitting billing information based upon the payment information.

36. The system according to claim 20,
wherein said at least one processing element is also for receiving hotel rental information associated with at least one of the travelers, wherein said at least one processing element is also for accessing a travel database comprising hotel rental information for the destination location, wherein said at least one processing element is also for identifying at least one hotel itinerary from the travel database based upon the hotel rental information, and wherein said at least one processing element is also for receiving an indication of a selected hotel itinerary from the at least one hotel itinerary; and
wherein said at least one display element is also for presenting the identified at least one hotel itinerary for review.

37. The system according to claim 20,
wherein said at least one processing element is also for receiving car rental information associated with at least one of the travelers, wherein said at least one processing element is also for accessing a travel database comprising car rental information for the destination location, wherein said at least one processing element is also for identifying at least one car rental itinerary from the travel database based upon the car rental information, and wherein said at least one processing element is also for receiving an indication of a selected car rental itinerary from the at least one car rental itinerary; and
wherein said at least one display element is also for presenting the at least one car rental itinerary for review.

38. The system according to claim 20, wherein said at least one processing element is also for providing electronic communication among at least two of a travel organizer and the travelers.

* * * * *

UNITED STATES PATENT AND TRADEMARK OFFICE
CERTIFICATE OF CORRECTION

PATENT NO. : 7,050,987 B2  
APPLICATION NO. : 10/634582  
DATED : May 23, 2006  
INVENTOR(S) : Lettovsky et al.

Page 1 of 1

It is certified that error appears in the above-identified patent and that said Letters Patent is hereby corrected as shown below:

<u>Column 6,</u>

Lines 42 and 44, "modem" should read --modern--.

<u>Column 7,</u>

Line 51, "modem" should read --modern--.

<u>Column 22,</u>

Line 19, "Themethod" should read --The method--.

Signed and Sealed this

Twelfth Day of December, 2006

JON W. DUDAS  
*Director of the United States Patent and Trademark Office*